US006741955B2

(12) United States Patent
Rutherford et al.

(10) Patent No.: US 6,741,955 B2
(45) Date of Patent: May 25, 2004

(54) SYSTEM AND METHOD FOR LEAK RATE TESTING DURING ADIABATIC COOLING

(75) Inventors: James M. Rutherford, Cypress, TX (US); Mark K. Ekblad, San Jose, CA (US)

(73) Assignee: Uson, L.P., Houston, TX (US)

( * ) Notice: Subject to any disclaimer, the term of this patent is extended or adjusted under 35 U.S.C. 154(b) by 0 days.

(21) Appl. No.: 10/087,729

(22) Filed: Mar. 5, 2002

(65) Prior Publication Data

US 2003/0171903 A1 Sep. 11, 2003

(51) Int. Cl.$^7$ ................................................ G06F 17/10
(52) U.S. Cl. ................................ 703/2; 703/6; 702/47; 702/98; 73/40.5 R
(58) Field of Search ......................... 703/2, 6; 702/45, 702/47, 51, 98; 73/40, 40.5 R, 49.1

(56) References Cited

U.S. PATENT DOCUMENTS

| | | | | |
|---|---|---|---|---|
| 4,625,545 A | * | 12/1986 | Holm et al. ................... 73/40 |
| 4,686,851 A | * | 8/1987 | Holm et al. .................. 73/49.2 |
| 5,078,006 A | * | 1/1992 | Maresca et al. ......... 73/40.5 R |
| 5,090,234 A | * | 2/1992 | Maresca et al. ............. 73/49.1 |
| 5,163,314 A | * | 11/1992 | Maresca, Jr. et al. .... 73/40.5 R |
| 5,170,657 A | * | 12/1992 | Maresca, Jr. et al. .... 73/40.5 R |
| 5,189,904 A | * | 3/1993 | Maresca, Jr. et al. .... 73/40.5 R |
| 5,375,455 A | * | 12/1994 | Maresca, Jr. et al. .... 73/40.5 R |
| 5,948,969 A | * | 9/1999 | Fierro et al. ............. 73/40.5 R |

OTHER PUBLICATIONS

Ruthberg, S. Gas Infusion into Doubled Hermetic Enclosures, IEEE Transactions on Parts, Hybrids, and Packaging, vol. PHP–13, No. 2, Jun. 1977, pp. 110–116.*

Henning, A.K. Microfluidic MEMS for Semiconductor Processing, Second Annual IEEE International Conference on Innovative Systems in Silicon, 1997, Oct. 1997, pp. 340–349.*

Henning, A.K. Microfluidic MEMS, IEEE, Aerospace Conference, 1998, vol. 1, Mar. 1998, pp. 471–486.*

Naso et al., V. Energy Transfer Process of Working Gas in Pulse Tube, IEEE, IECEC 35th Intersociety Energy Conversion Engineering Conference and Exhibit, 2000, pp. 424–427.*

Sobhan et al., C.B. A Computational Model for the Transient Analysis of Flat Heat Pipes, IEEE, The Seventh Intersociety Conference on Thermal and Thermomechanical Phenomena in Electronic Systems, 2000, vol. 2, pp. 106–113.*

* cited by examiner

*Primary Examiner*—Russell Frejd
(74) *Attorney, Agent, or Firm*—Christopher J. Rourk; Akin Gump Strauss Hauer & Feld, LLP

(57) ABSTRACT

A system for determining a leak rate of a device during an adiabatic cooling phase is provided. The system includes a leak rate training system receiving leak rate calibration data, such as pressure data or mass flow data for a device having a known leakage rate. The leak rate training system generates an adiabatic cooling model from the leak rate calibration data, such as by solving a finite difference equation for one or more unknown process variables that are dependent on the adiabatic cooling parameters of the device. The system further includes a leak rate detection system receiving the adiabatic cooling model and leak rate data and determining a leak rate component of the leak rate data using the adiabatic cooling model, such as by using the variable values determined through solving the finite difference model to interpolate between the leak rate calibration data that was gathered using known leakage rates.

17 Claims, 4 Drawing Sheets

US 6,741,955 B2

SYSTEM AND METHOD FOR LEAK RATE TESTING DURING ADIABATIC COOLING

FIELD OF THE INVENTION

The present invention is related to leak rate testing, and is more specifically related to determining the leak rate of a pressurized device during the period where the pressurized gas in the device is undergoing adiabatic cooling.

BACKGROUND OF THE INVENTION

Systems for performing leak rate testing are known in the art. These systems typically pressurize a device with a gas, and then measure the rate at which the gas escapes from the device. Some systems use the change in pressure over time to determine the leak rate. Other systems use the mass flow into the device to determine the leak rate, such as when the gas is supplied from a source that is at a regulated pressure.

One drawback with existing systems for performing leak rate testing is that they must wait until a period of adiabatic cooling has finished before the leak rate can be measured. Adiabatic cooling occurs because the gas that is used to pressurize the device experiences a temperature rise as it is pressurized. Pressure changes or mass flow changes created by the cooling gas occur at an exponential rate, whereas pressure changes or mass flow changes created by leakage occur at a linear rate. As such, it is difficult to separate the effects of adiabatic cooling from the leakage effects, and leak testing of the device must wait until the adiabatic cooling has progressed to a point where pressure or mass flow changes caused by adiabatic cooling are much less than the pressure or mass flow changes caused by the leak rates that are being measured.

SUMMARY OF THE INVENTION

In accordance with the present invention, a system and method for leak rate testing during adiabatic cooling are provided that overcome known problems with leak rate testing.

In particular, a system and method for leak rate testing during adiabatic cooling are provided that model the adiabatic cooling process so that the leak rate can be determined during the adiabatic cooling period by measuring pressure, mass flow rate, or other suitable data.

In accordance with an exemplary embodiment of the present invention, a system for determining a leak rate of a device during an adiabatic cooling phase is provided. The system includes a leak rate training system receiving leak rate calibration data, such as pressure data or mass flow data for a device having a known leakage rate. The leak rate training system generates an adiabatic cooling model from the leak rate calibration data, such as by solving a finite difference equation for one or more unknown process variables that are dependent on the adiabatic cooling parameters of the device. The system further includes a leak rate detection system receiving the adiabatic cooling model and leak rate data and determining a leak rate component of the leak rate data using the adiabatic cooling model, such as by using the variable values determined through solving the finite difference model to interpolate between the leak rate calibration data that was gathered using known leakage rates.

The present invention provides many important technical advantages. One important technical advantage of the present invention is a system and method for measuring leak rates during adiabatic cooling that use a model of the change in a leak rate metric, such as pressure or mass flow, to determine the change in the leak rate metric caused by adiabatic cooling. The invention allows leak rate data to be extracted from the leak rate metric during the adiabatic cooling period, such that the leak rate can be determined faster than in prior art systems and methods.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
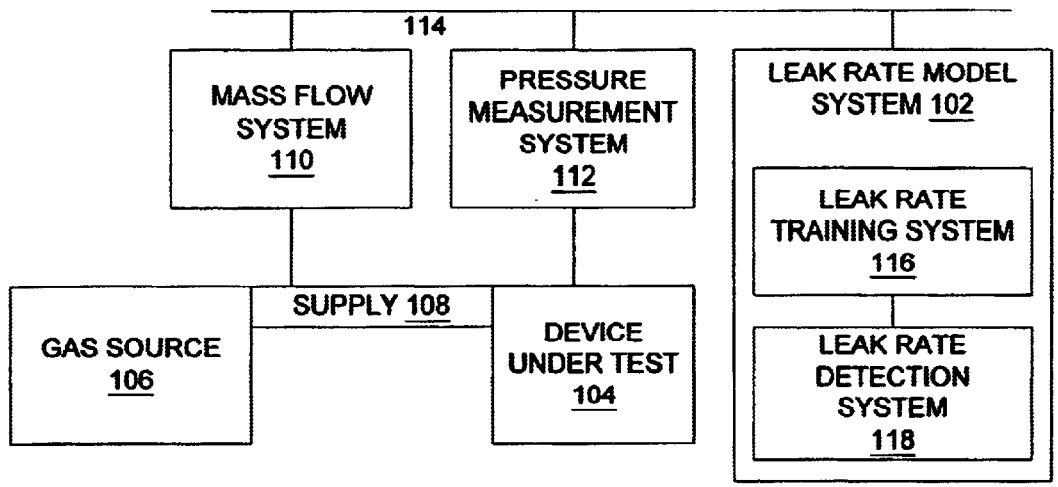
FIG. 1 is a diagram of a system for determining leak rates using a model of changes in volume due to adiabatic cooling in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for determining leak rates using a model of changes in volume due to adiabatic cooling in accordance with an exemplary embodiment of the present invention. System 100 allows the adiabatic cooling of a device under test to be compensated for so that the leak rate can be determined before the gas temperature of the pressurized gas in the device has stabilized.

System 100 includes leak rate model system 102, which can be implemented in hardware, software, or a suitable combination of hardware and software, and which can be one or more hardware systems, or one or more software systems operating on a general purpose processor platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of software in a specific purpose software application.

Leak rate model system 102 is coupled to mass flow system 110 and pressure measurement system via communications medium 114, and receives mass flow data, pressure data, temperature data, barometric pressure data, humidity data, or other suitable data from these or other systems. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system of a digital signal processor. Communications medium 114 can be a copper conductor, a data bus, an optical fiber, a data connection, a wireless connection, or other suitable communications media.

Leak rate model system 102 determines the value of variables that are required for modeling the adiabatic cooling effects for gas in device under test 104, so that the leakage from the device under test 104 can be determined during the adiabatic cooling period. Device under test 104 is pressurized with gas from gas source 106 through supply line 108. As device under test 104 is pressurized, measurements of mass flow can be taken by leak rate model system 102 using mass flow system 110, or measurements of pressure within the device can be taken using pressure measurement system 112. If a mass flow test is being performed, then the pressure behind gas source 106 is typically held constant, such that changes in mass flow detected by mass flow system 110 can be used to determine the leak rate of gas from device under test 104. Likewise, if pressure measurements are used to determine leak rate, then the gas input through supply line 108 can be shut off, such that the change in internal gas pressure over time of device under test 104 can be used to determine the leak rate.

Leak rate model system 102 receives mass flow data, pressure data, or other data as a function of time, and either uses that data to develop a model for determining the adiabatic cooling rate of device under test 104, or applies the model to determine the leak rate of device under test 104. Leak rate model system 102 includes leak rate training system 116 and leak rate detection system 118, each of which can be implemented in hardware, software, or a suitable combination of hardware and software, and which can be one or more software systems operating on a general purpose processor platform. Leak rate training system 116 is used to determine an adiabatic cooling rate model for device under test 104 that can be used for determining the leak rate of other devices having the same or a related configuration as device under test 104. In this exemplary embodiment, leak rate training system 116 can be used on an initial device in a manufacturing process, such as to develop the adiabatic cooling model that can be used to separate the linear leak rate component of leak rate metric data from the exponential adiabatic cooling component.

Leak rate detection system 118 receives the adiabatic cooling model from leak rate training system 116, and performs leak rate testing of device under test 104 during manufacturing operations, as part of quality control, or in other suitable manners. Thus, leak rate training system 116 is used to develop a model that is used by leak rate detection system 118, which determines the leak rate of device under test 104 during the adiabatic cooling period.

In operation, system 100 allows the time required to perform leak rate testing to be reduced significantly, by allowing the adiabatic cooling of gasses that are used to pressurize device under test 104 to be modeled so as to allow the linear leak rate component of leak rate metric data for the device under test 104 to be determined prior to the end of the exponential decay period of the adiabatic cooling period. In this manner, system 100 allows empirical measurements of known leak rates of device under test 104 to be used to determine a model of the adiabatic cooling of device under test 104. This model can be used to determine the leak rate of a device having an unknown leak rate. System 100 uses the model to determine the component of a leak rate metric, such as a mass flow rate measurement, a pressure change measurement, or other suitable measured data, that is due to leakage as opposed to adiabatic cooling of the pressurized gas within the component.

In one exemplary embodiment, pressure decay leak testing can be used where a "gray-box" of the following form is modelled:

$$P(t)=A(T)e^{-\lambda t}+\text{bias}-ct \qquad \text{(Equation 1)}$$

Where

P(t)=measured pressure of the part under test at time t
A(T)=function of ambient conditions (temperature)
$\lambda$=time constant of the part under test
bias=steady-state offset of the system under test
c=leak rate in psi/sec and
t=time in seconds The leak can be modeled as an exponential, but where the decay rate is fast, the exponential can be approximated as a linear term. The time constant, $\lambda$ can be a constant and a physical property of the part being tested. Thus, $\lambda$ can be determined for the no leak case, i.e. c=0. The parameters A, bias, and $\lambda$ can be found using optimization techniques, least-squares, trial and error, or other suitable processes.

The following difference equation is an equivalent representation of Equation 1:

$$y_{k+1}=ay_k+b-ck, k=0, 1, 2, \ldots \qquad \text{(Equation 2)}$$

Where y=measured process variable (such as pressure)
a=time constant
b=bias pressure term
c=leak rate in PSI/(sample period) and
k=index variable that is equivalent to time.

To determine the model coefficients in a batch manner the following matrix of data can be used:

$$\begin{bmatrix} y_0 & 1 & -1 \\ y_1 & 1 & -2 \\ \vdots & \vdots & \vdots \\ y_{n-1} & 1 & n-1 \end{bmatrix} \begin{bmatrix} a \\ b \\ c \end{bmatrix} = \begin{bmatrix} y_1 \\ y_2 \\ \vdots \\ y_n \end{bmatrix} \qquad \text{(Equation 3)}$$

Where n is the number of data points. The matrix is then inverted on the left-hand side of Equation 3 to solve for the coefficients, which can result in an over-determined system.

A Moore-Penrose inverse or pseudo-inverse of the matrix can then be computed. It should be noted that no iteration is required to determine the process time constant. This technique is commonly called Batch Least-Squares (BLS). The following procedure can then be used for calibration:

Step 1 Determine a, b for no leak case

Step 2 Fix a and determine b, c for calibration leak rates (target leak rate/2, target leak rate, target leak rate*2)

Step 3 Using values of c and calibration leak rates fit to curve that relates computed value of c to cc/min, such as by using least-squares, cubic-splines, or other suitable processes.

This technique can be generalized to include multiple variables in the model, such as temperature, relative humidity, or other equations that include past history of data (e.g. $y_{k-2}$), etc.

The BLS technique can be used for off-line computations due to the processing requirements. To perform on-line parameter identification one can use recursive least-squares, Kalman filter, Extended Kalman Filter, Neural Networks, or other suitable processes. In one exemplary embodiment, the following equations can be used:

Let t=kT, where T is the sampling period of the A/D's and k=0, 1, 2, 3, . . . , n.

Let $\lambda$=a from Equation 2, which is constant.

$$P(kT)=Ae^{-\lambda kT}+\text{bias}-c^*(kT), k=0, 1, 2, \ldots.$$

The parameters A, bias, and c can be solved for in real-time, and the value of c can then be converted to a leak rate in cc/min using the calibration polynomial obtained in step 3 above. One exemplary procedure for solving for these parameters is to form the following matrix for each sample period:

$$\left[\begin{array}{ccc|c} \vdots & \vdots & \vdots & \vdots \\ e^{-\lambda kT} & 1 & kT & P(kT) \end{array}\right]$$

Givens rotations can then be performed on the matrix to bring it to an upper triangular form, to yield the following matrix:

$$\left[\begin{array}{ccc|c} f_{11} & f_{12} & f_{13} & g_1 \\ 0 & f_{22} & f_{21} & g_2 \\ 0 & 0 & f_{33} & g_3 \\ \hline 0 & 0 & 0 & e \end{array}\right]$$

At each sample period the bottom row can be refilled with the new data and brought to the above form using Givens rotations. The prediction variance of the model can then be determined using the following relationship:

e*e/(number of samples)

If this value is within an acceptable range, the values of A, bias, and c (i.e. $c=g_3/f_{33}$) can be solved for using back substitution, and c can then be converted to cc/min to yield the final leak rate.

Figure 2:
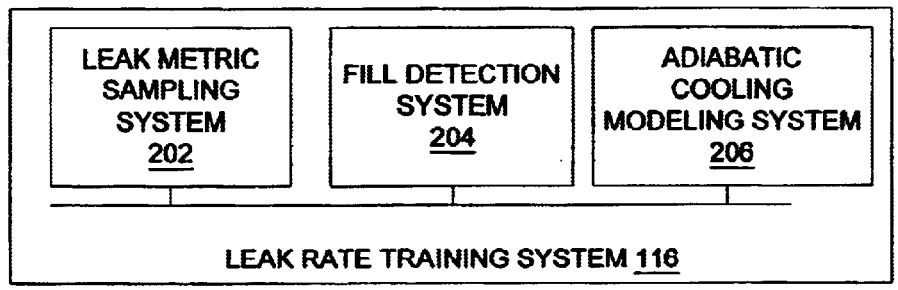
FIG. 2 is a diagram of a system for adiabatic cooling model training in accordance with an exemplary embodiment of the present invention.

FIG. 2 is a diagram of a system 200 for performing leak rate training in accordance with an exemplary embodiment of the present invention. System 200 includes leak rate training system 116 and leak metric sampling system 202, fill detection system 204, and adiabatic cooling modeling system 206, each of which can be can be implemented in hardware, software, or a suitable combination of hardware and software, and which can be one or more software systems operating on a general purpose processor platform.

Leak metric sampling system 202 performs leak rate metric data sampling. In one exemplary embodiment, the leak rate metric data can include mass flow rate data, pressure data, or other suitable data, and can be measured at a frequency that provides the necessary level of detail to develop an adiabatic cooling rate model. In one exemplary embodiment, it may be determined that the sample rate for developing the adiabatic cooling rate model must be greater than the sample rate for applying the model to devices under test in a production configuration, for quality assurance testing, or in other suitable configurations. Likewise, leak metric sampling system 202 can be optimized to adjust the sampling frequency based on the expected leak rate, the volume of the device under test, the material that the device under test is constructed from, humidity levels, air pressure, or other suitable testing parameters.

Fill detection system 204 receives leak metric sampling data from leak metric sampling system 202 and determines when a device under test has been filled and is starting to experience adiabatic cooling and possibly leakage. In one exemplary embodiment, fill detection system 204 can determine when a rate of change of the mass flow rate or of a change in pressure has occurred that indicates that the device under test has reached a maximum fill and has initiated adiabatic cooling of the pressurization gas. Likewise, fill detection system 204 can generate adiabatic cooling rate modeling initiation data, such as to begin a real time adiabatic cooling rate modeling process. Fill detection system 204 can also generate fill detection marker data for use in correlating results for various leak rates to generate adiabatic cooling rate modeling.

Adiabatic cooling modeling system 206 receives leak metric sample data from leak metric sampling system 202 and fill indication data from fill detection system 204 for two or more sets of data, such as for two or more different leak rates, and determines adiabatic modeling parameters to be used for separating the adiabatic cooling component of mass flow data, pressure data, or other leak metric data from the leak component of the leak metric data. In one exemplary embodiment, adiabatic cooling modeling system 206 can receive a first set of data for a device having no leakage, such that the only effect being determined is from changes in pressure or mass flow rate due to adiabatic cooling. Adiabatic cooling rate modeling system 206 can also receive leak metric sampling data for various leak rates, such as leak rates selected based on allowable leak rates from the device under test, industry standard leak rate specifications, or other suitable leak rates.

In one exemplary embodiment, adiabatic cooling modeling system 206 can be used to generate an adiabatic cooling rate model for a device under test having a permissible leak rate of X cubic centimeters per minute. Leak metric sampling system 202 can be used to generate leak metric sampling data for a device under test that is operated with a leak rate of 0 cubic centimeters per minute, X/2 cubic centimeters per minute, X cubic centimeters per minute, and 2X cubic centimeters per minute, such that adiabatic cooling modeling system 206 can be used to develop optimized modeling parameters within the expected range of leakage. The leak rate can then be modeled based on the known values of change in mass flow rate or pressure for known leak rates as a function of time. For example, a set of finite difference equations that model the leak rate as a function of change in pressure or change in mass flow over time can be assembled. These finite difference equations can contain one or more unknown variables that have a value based on the adiabatic cooling processes of the device. The time sampled measurements can be used to solve for the value of these variables of the finite difference equations. In one exemplary embodiment, the following finite difference equation can be used:

$$Y_{K+1}=aY_K+b-cK, K=0, 1, 2, \ldots$$

where

Y=leak rate metric (e.g. pressure, mass flow rate)
a=time constant
b=bias pressure term
c=leak rate in PSI/(sample period)
K=index variable that is equivalent to time and $$\begin{vmatrix} Y_0 & 1 & -1 \\ Y_1 & 1 & -2 \\ \vdots & \vdots & \vdots \\ Y_{n-1} & 1 & n-1 \end{vmatrix} * \begin{vmatrix} a \\ b \\ c \end{vmatrix} = \begin{vmatrix} Y_1 \\ Y_2 \\ \vdots \\ Y_n \end{vmatrix}$$

By inverting the matrix of known values of $Y_n$, it is possible to solve for the unknowns [a, b, c] that are a function of the adiabatic cooling parameters for the device under test, such as the surface area, material, volume, and other parameters that may be difficult to model numerically. Adiabatic cooling modeling system 206 then stores these parameters for subsequent use by a leak rate detection system 118 or other suitable systems.

In operation, system 300 is used to develop an adiabatic cooling rate model based on leak metric sampling data, fill detection data, and other suitable data. When a device under test is being filled with gas for the purpose of performing leak rate testing, the mass flow rate, change in pressure, or other suitable data can be measured for the device to determine leak rates. Leak rate metric measurements for known leak rates can then be used to calibrate a model of the device, such as a set of finite difference equations having one or more variables that are a function of the adiabatic cooling parameters of the device. The leak rate component of the leak rate metric data can then be determined by separating the adiabatic cooling component from the leak rate component analytically during the adiabatic cooling period.

Figure 3:
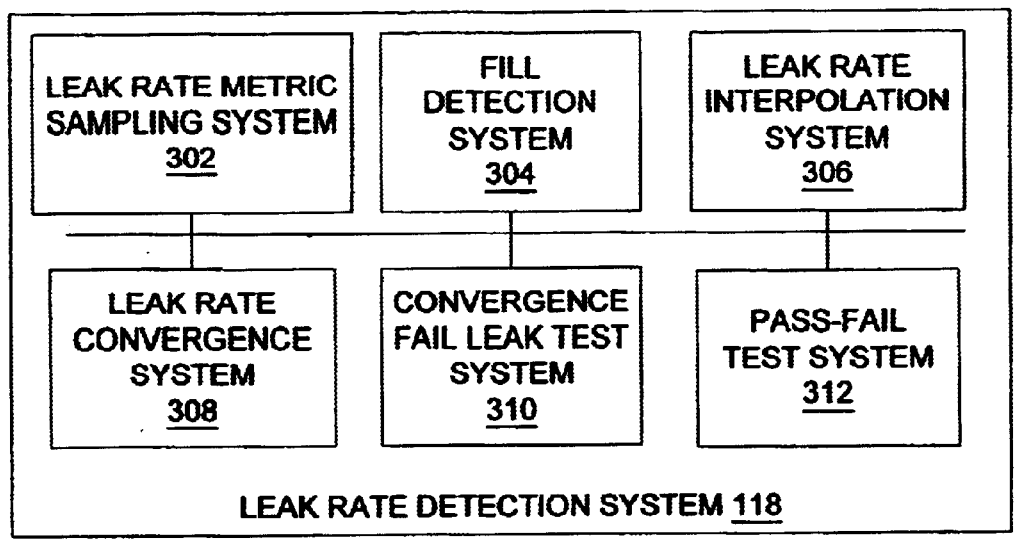
FIG. 3 is a diagram of a system for detecting leak rates in accordance with an exemplary embodiment of the present invention.

FIG. 3 is a diagram of a system 300 for detecting leak rates in accordance with an exemplary embodiment of the present invention. System 300 includes leak rate detection system 118 and leak rate metric sampling system 302, fill detection system 304, leak rate interpolation system 306, leak rate convergence system 308, convergence fail leak test system 310, and pass-fail test system 312, each of which can be implemented in hardware, software, or a suitable combination of hardware and software, and which can be one or more software systems operating on a general purpose processor platform.

Leak rate metric sampling system 302 samples mass flow data, pressure data, or other suitable data in accordance with leak rate testing of production devices, quality assurance devices, or other suitable devices. Leak rate metric sampling system 302 can set the sample frequency based on physical parameters of the device under test (such as size, expected leak rate, or material), ambient conditions (such as the barometric pressure or humidity), measurement tolerance or accuracy, or other suitable data. Likewise, leak rate metric sampling system 302 can increase or decrease the sampling rate based upon test results, such as to improve convergence, to perform conventional leak rate analysis after the adiabatic cooling parameters have decayed when the convergence results for determining a leak rate during adiabatic cooling are inadequate, or for other suitable reasons.

Fill detection system 304 determines when a device under test has been filled to a peak pressure or has reached a maximum amount of mass, such that decreases in pressure or changes in mass flow rate can be used to determine the leakage rate of the device. In one exemplary embodiment, fill detection system 304 determines a peak pressure of a device. In another exemplary embodiment, fill detection system 304 determines a change in the rate of mass flow indicative of the end of filling of a device and the beginning of adiabatic cooling and leakage from the device. Fill detection system 304 generates fill data for the device.

Leak rate interpolation system 306 receives adiabatic cooling modeling data and performs interpolation of leak rate metric data to generate estimated leak rate data for the device under test. In one exemplary embodiment, a device under test can be tested at two or more leak rates, such that the measured pressure or mass flow into the device can be used to estimate the estimated leak rate by interpolating between two or more known leak rates. In this exemplary embodiment, leak rate interpolation system 306 can perform a least squares fit or other suitable leak metric interpolations between corresponding calibration data points measured at the sample rate to solve for one or more unknown variables in a finite difference equation, and can determine the estimated leak rate component of the leak metric data based on the modeled adiabatic cooling component using the variable values determined through calibration testing.

Leak rate convergence system 308 receives leak rate data and determines whether convergence on a final leak rate is being reached. In one exemplary embodiment, leak rate convergence system 308 can track the change in estimated leak rate data from leak rate interpolation system 306 and can determine whether the change in estimated leak rate data is within an allowable change that is indicative of convergence on the final leak rate. Leak rate convergence system 308 can then generate final leak rate data, non-convergence indicator data, operator notification data, or other suitable data.

Convergence fail leak test system 310 receives non-convergence indicator data and generates control data to allow the leak rate test to continue, so that the leak rate can be measured using conventional measurement techniques after changes in pressure, mass flow, or other leak rate metrics have decreased to the point where the adiabatic cooling component of the leak rate metric is less than the leak rate component. Convergence fail leak test system 310 thus allows leak test data to be generated even when non-convergence occurs during the adiabatic cooling period. Convergence fail leak test system 310 can also generate operator notification data or other suitable data to indicate the failure of leak rate determination during the adiabatic cooling period.

Pass-fail test system 312 uses a model of a target leak rate and propagates it to obtain an estimate of what the measured variable, e.g. pressure, should be in the future given the first pressure measured at the beginning of the leak step. The difference between what the model predicts the pressure should be and what is actually measured is filtered and differentiated to obtain a rate or velocity of escape from the "true" target leak rate. If this velocity is negative than the part passes since the system under test is exhibiting a slower decay than the target. Conversely if the velocity is positive the part fails since the pressure is decaying faster which implies a higher leak rate. Pass-fail test system 312 can be used to estimate the leak rate if the velocity is correlated to the calibration rates and a calibration polynomial is produced that is a function of the escape velocity.

In operation, system 300 allows leak rates to be detected in devices under test during the adiabatic cooling period when pressure, mass flow, or other parameters indicative of leaking are changing exponentially as a function of the adiabatic cooling, as well as linearly as a function of any leakage. System 300 thus allows the linear leakage component to be determined during the exponential adiabatic cooling component so that the time required for performing a leak rate test is minimized. System 300 also allows conventional leak rate testing to be performed, such as in the event of failure of convergence for a given device under test and after the adiabatic cooling period has ended.

Figure 4:
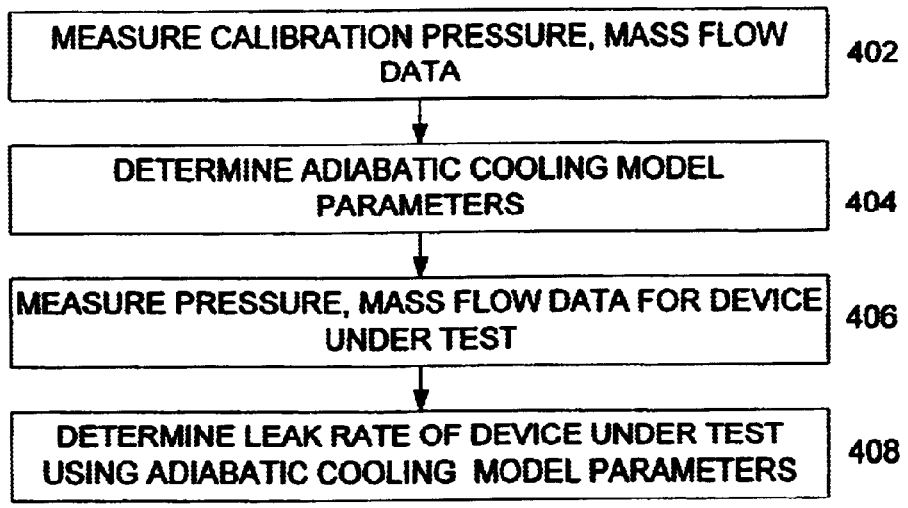
FIG. 4 is a flowchart of a method for performing adiabatic cooling modeling and testing in accordance with an exemplary embodiment of the present invention.

FIG. 4 is a flowchart of a method 400 for performing adiabatic cooling rate modeling and testing in accordance with an exemplary embodiment of the present invention. Method 400 allows a model of the adiabatic cooling of a device under test to be developed that can be used to differentiate between leakage from a device under test and adiabatic cooling of the device, such as in production, for quality assurance, or in other circumstances or situations where a large number of devices are being tested and where the time for testing each device is to be minimized.

Method 400 begins at 402, where calibration pressure, calibration mass flow, or other suitable data is measured. In one exemplary embodiment, the pressure within a device under test can be measured on a periodic basis, such as every X seconds, where the value of X is determined based on the expected leak rate from the device, the expected adiabatic cooling rate of the device, the materials from which the device is made, the volume of the device, the elevation at which testing occurs, the relative humidity of the air that is used to pressurize the device, or other suitable leak rate testing parameters. The method then proceeds to 404.

At 404, adiabatic cooling rate model parameters are determined. In one exemplary embodiment, pressure data, mass flow data, or other leak rate metric data can be placed into a matrix corresponding to the following equations:

$$Y_{K+1} = aY_K + b - cK, K = 0, 1, 2, \ldots$$

where

Y=leak rate metric (e.g. pressure, mass flow rate)
a=time constant
b=bias pressure term
c=leak rate in PSI/(sample period)
K=index variable that is equivalent to time and $$\begin{vmatrix} y_0 & 1 & -1 \\ y_1 & 1 & -2 \\ \vdots & \vdots & \vdots \\ y_{n-1} & 1 & n-1 \end{vmatrix} * \begin{vmatrix} a \\ b \\ c \end{vmatrix} = \begin{vmatrix} y_1 \\ y_2 \\ \vdots \\ y_n \end{vmatrix}$$

The matrix can then be inverted to solve for the variables [a, b, c], which can then be used to determine the adiabatic cooling component of leak rate metrics obtained for other devices having unknown leak rates. Likewise, a similar process can be used for mass flow using mass flow characteristic finite difference equations. The adiabatic cooling rate model can also be verified, such as by using a set of leak rate metric data for a known leak rate to determine whether the model converges on the known leak rate. The method then proceeds to 406.

At 406, pressure data, mass flow data, or other suitable leak rate metric data is measured on a device during production tests, quality assurance tests, or in other suitable manners. The device can be identical in design and construction to the device that was used to develop the model, such as where a first device from an assembly line is used to develop a model that is used to test subsequent devices from the assembly line. Likewise, the model can be used on devices with insubstantial differences from the calibration device. The method then proceeds to 408.

At 408, the leak rate of the device under test is determined using the adiabatic cooling model. In one exemplary embodiment, if the adiabatic cooling model includes one or more variables for which values are determined using calibration data, the calibration values can be used to calculate the estimated leak rate based on the leak rate metric data. The change in estimated leak rate as time progresses can then be analyzed to determine whether convergence on a final leak rate is occurring. If the leak rate does not converge, notification data can be generated, traditional methods of determining leak rate can be used after the adiabatic cooling period has ended, or other suitable processes can be implemented.

In operation, method 400 allows leak rates to be measured during an adiabatic cooling period for a device under test, so as to reduce the amount of time required to measure the leak rate of the device. Method 400 uses a model of a device under test, and is calibrated with data measured from a device with known leak rates to determine the value of model variables.

Figure 5:
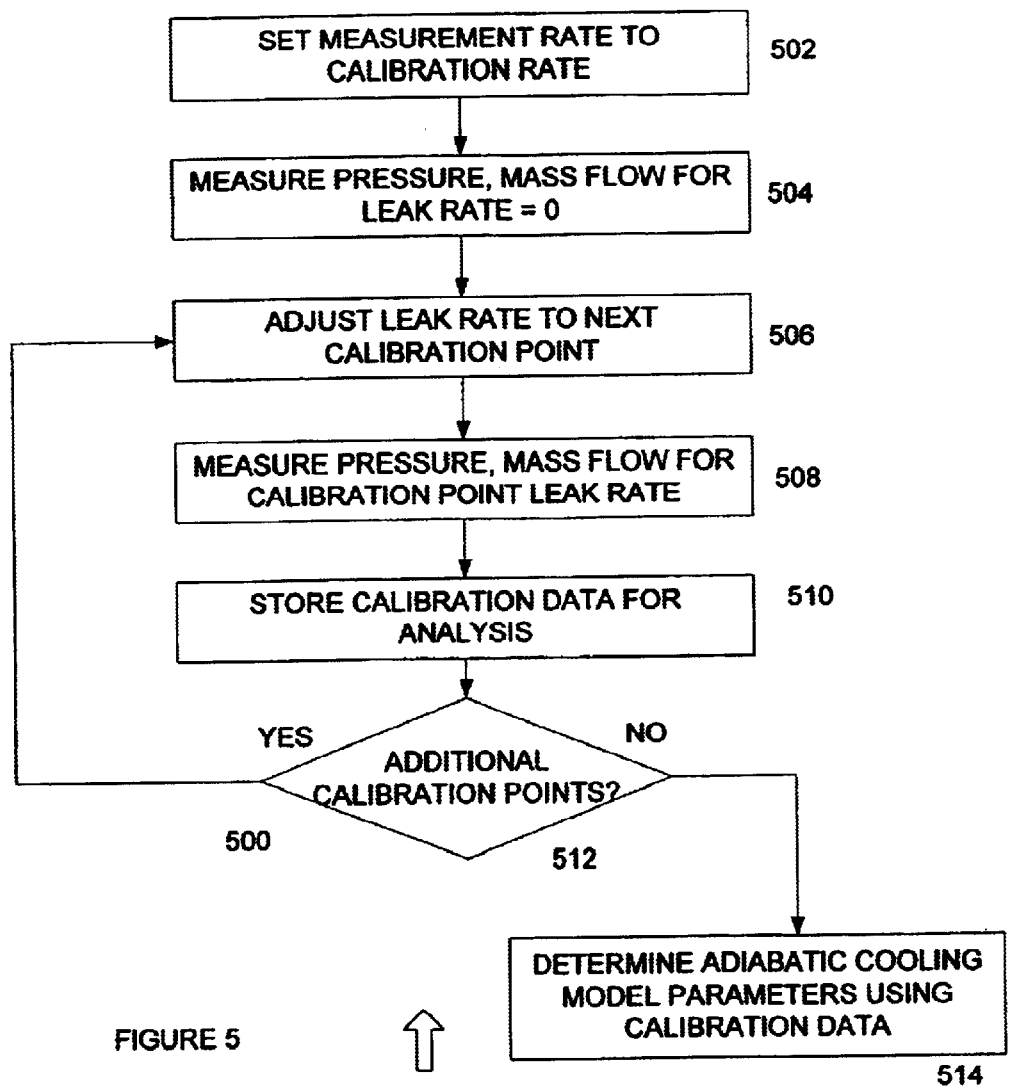
FIG. 5 is a flowchart of a method for measuring calibration pressure data, mass flow data, or other suitable data in accordance with an exemplary embodiment of the present invention.

FIG. 5 is a flowchart of a method 500 for measuring calibration pressure data, mass flow data, or other suitable data in accordance with an exemplary embodiment of the present invention. Method 500 is used to measure calibration data for use in calibrating an adiabatic cooling rate model for determining the leak rate during adiabatic cooling of the device under test.

Method 500 begins at 502 where a measurement rate is set to a calibration rate. In one exemplary embodiment, the same device can be used to determine the calibration model as is used to perform testing under normal conditions. In this exemplary embodiment, the calibration measurement rate can vary from the measurement test rate for production tests. After the measurement rate has been set to the calibration rate, the method proceeds to 504.

At 504, the pressure data, mass flow data, or other suitable data is measured for a device under test that has a known leak rate equal to 0 or otherwise much smaller than the leak rates that are to be measured. In one exemplary embodiment, a device under test can be tested by pressurizing it to a maximum pressure with a gas, and then by sealing the gas inlet so that any decreases in the pressure of the device are due to adiabatic cooling of the gas within the device, leakage from the device, and temperature changes of the device. In this exemplary embodiment, if the calibration of the device and production testing of similar devices is performed at approximately the same temperature, and if the device temperatures are maintained constant, then the only variables are the adiabatic cooling and the leak rate. As the adiabatic cooling process for similar devices will be approximately the same as for other devices having similar geometry, volumes, materials, barometric pressures, humidity, or other parameters, a model for the adiabatic cooling component of a leak rate metric can be developed and used for determining the leak rate component and adiabatic cooling component for a device in production testing. The method then proceeds to 506.

At 506, the leak rate is adjusted to the next calibration point. In one exemplary embodiment, at least two calibration points are required in order to determine the adiabatic cooling coefficients. For example, if the expected or maximum allowable leak rate for a device is X cubic centimeters per minute, leak rate testing can be performed at X/2 cubic centimeters per minute, X cubic centimeters per minute, 2X cubic centimeters per minute, 4X cubic centimeters per minute, or other suitable leak rate calibration rates. After the leak rate is adjusted to the next calibration point at 506, the method proceeds to 508.

At 508, pressure data, mass flow data, or other suitable data for the calibration point of the leak rate is measured. In one exemplary embodiment, the number of measurement points for each leak rate can be identical, so as to allow the points for different leak rates to be correlated and to allow interpolation to be performed between such points. The method then proceeds to 510.

At 510, calibration data is stored for analysis. In one exemplary embodiment, the calibration data can be stored in a random access memory device, in a tape or magnetic media, optical media, or other suitable media. The method then proceeds to 512.

At 512, it is determined whether additional calibration points are required. If additional calibration points are required, the method returns to 506. Otherwise, the method proceeds to 514 where adiabatic cooling rate model parameters are determined using the calibration data.

In operation, method 500 allows the adiabatic cooling parameters for a device under test to be determined so as to allow the leak rate component of the leak rate metric for the device to be determined during adiabatic cooling. Method 500 allows sets of calibration data to be measured for various known leak rates from a calibration device, such that the known leak rates can be used to determined the adiabatic cooling parameters so as to allow the leak rate of devices during production testing, quality assurance testing, or other testing to be determined.

Figure 6:
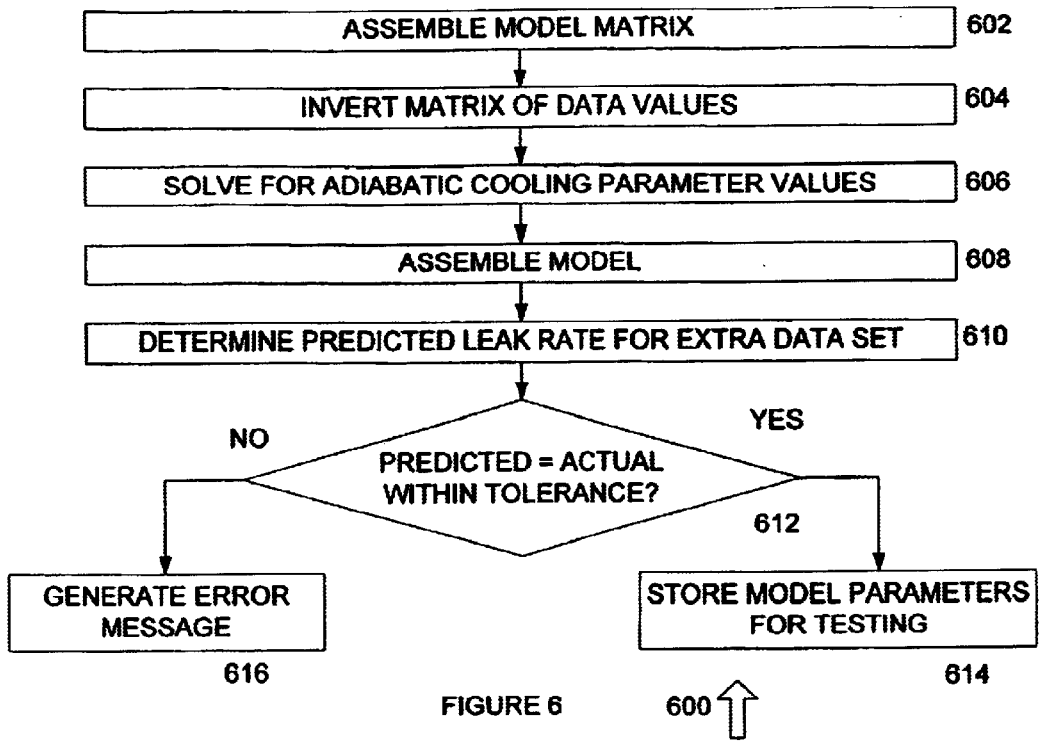
FIG. 6 is a flowchart of a method for determining an adiabatic cooling model for a device in accordance with an exemplary embodiment of the present invention.

FIG. 6 is a flowchart of a method 600 for determining an adiabatic cooling rate model for a device in accordance with an exemplary embodiment of the present invention. Method 600 begins at 602 where a model matrix is assembled. In one exemplary embodiment, data that can be used to determine a leak rate, such as pressure data, mass flow rate data, or other suitable data that can be used to determine a leak rate, can be measured over time for a calibration device, such as with no leakage and with one or more calibration leakage rates. The change in leak rate data can then be analyzed over time to determine the value of variables that represent the effects of adiabatic cooling, which can be exponentially decreasing, based on the known changes due to leakage from the device, which can be linearly decreasing. The model can include a set of equations as a function of time in a matrix format, such that a first matrix of coefficients is multiplied by a second matrix of unknown variables and is set equal to a third matrix of known values. In this manner, the values for the unknown variables can be determined by inverting the matrix of coefficients and multiplying them times the known values. This occurs at 606, where the adiabatic cooling rate parameter values are solved in this manner. The method then proceeds to 608.

At 608, the adiabatic cooling rate model is assembled using the parameters determined at 606. For example, the model can include the determined variable values in a system that receives mass flow data, pressure data, or other suitable data as a function of time and yields estimated leak rate data at each time step. The method then proceeds to 610 where a predicted leak rate is determined for an extra data set having a known leak rate. In one exemplary embodiment, the extra data set can be measured within a range of expected leak rates, outside of the range of expected leak rates, or for other suitable leak rates. The method then proceeds to 612.

At 612, it is determined whether the leak rate predicted by applying the model to the extra data set equals the actual leak rate within a predetermined tolerance. For example, tolerance levels can be specified according to standards, client requirements, or other suitable tolerance settings. If it is determined that the predicted leak rate is equal to the actual leak rate within the predetermined tolerance, the method proceeds to 614 where the model parameters are stored for production testing, quality assurance testing, or other suitable testing. Otherwise, the method proceeds to 616 where an error message is generated notifying an operator of the need to repeat testing, inspect the device that was used to develop the parameter values, or perform other suitable actions.

In operation, method 600 allows a model of a device that is being pressure tested to be created that includes linear leak rate components and adiabatic cooling components, such that the leak rate of the device can be determined during the adiabatic cooling process. Method 600 thus allows leak rate testing to be expedited by allowing the linear leak rate to be determined during the adiabatic cooling process, which would otherwise prevent the linear leak rate measurements from being taken using prior art systems and methods.

Figure 7:
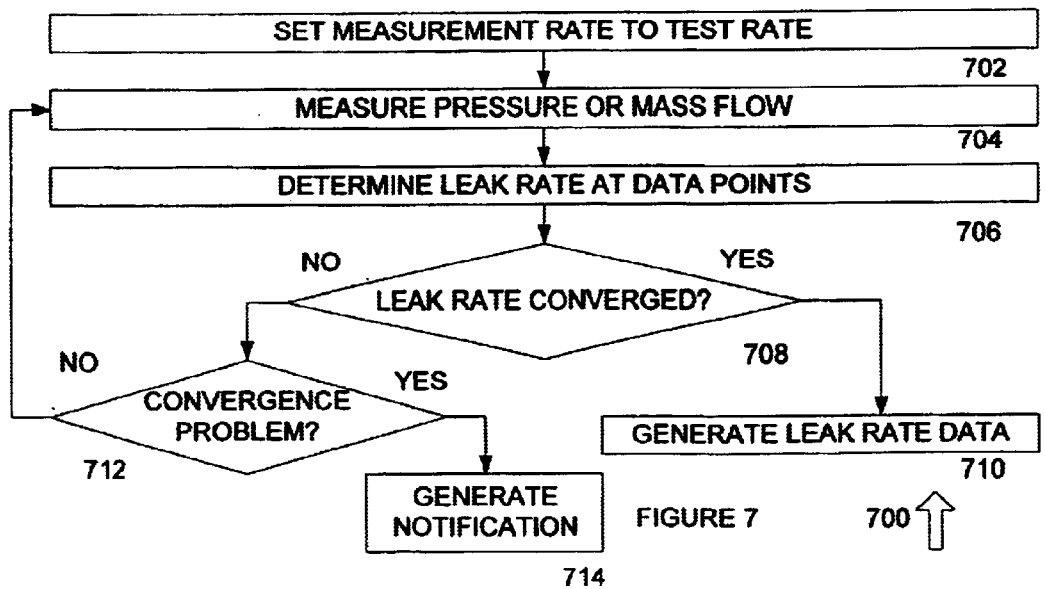
FIG. 7 is a flowchart of a method for performing a leak rate test using an adiabatic cooling model in accordance with an exemplary embodiment of the present invention.

FIG. 7 is a flowchart of a method 700 for performing a leak rate test using an adiabatic cooling rate model in accordance with an exemplary embodiment of the present invention. Method 700 begins at 702 where a measurement is set to a test rate. In one exemplary embodiment, mass flow data, pressure data, or other suitable data for a device that is being leak tested can be taken at a rate that minimizes the data processing requirements, maximizes the number of devices that can be measured in a unit time, or that otherwise meets desired measurement tolerance values or other suitable values. The method then proceeds to 704.

At 704, the pressure data, mass flow rate data, device temperature, ambient pressure, relative humidity, or other suitable data are measured. The method then proceeds to 706. At 706, a leak rate is determined for each of the data points. In one exemplary embodiment, a leak rate can be determined for each data point as it is measured. The method then proceeds to 708.

At 708, it is determined whether the leak rate has converged. In one exemplary embodiment, an estimated leak rate can be determined for each data point or time step, and the change in leak rate over time can be used to determine whether convergence has occurred on a single leak rate value within a predetermined tolerance range. If it is determined at 708 that a leak rate has converged, the method proceeds to 710, where leak rate data is generated. Otherwise, the method proceeds to 712, where it is determined whether there is a convergence problem. In one exemplary embodiment, convergence should occur within a predetermined time. If convergence has not occurred within this predetermined time, then the method proceeds to 714, where notification is generated, a period of time is allowed to elapse until traditional leak rate testing can be performed, or other suitable processes are performed. If it is determined that a convergence problem does not exist at 712, the method returns to 704.

In operation, method 700 is used to perform leak rate testing of a device under test, such as for production testing, quality assurance testing, or other suitable testing. Method 700 allows the leak rate of the device to be determined during the period of time when adiabatic cooling is occurring, such that the adiabatic cooling effects that result in variations in pressure, mass flow rate, or other variations can be disregarded. Method 700 thus allows pressure testing of devices and the determination of leak rates to be performed in a significantly shorter period of time, allowing the leak rate testing to be expedited.

Although exemplary embodiments of a system and method of the present invention have been described in detail herein, those skilled in the art will also recognize that various substitutions and modifications can be made to the systems and methods without departing from the scope and spirit of the appended claims. For example, even though pressure testing has been discussed herein, the invention can also be used in conjunction with vacuum testing or other suitable types of leak testing.

What is claimed is:

1. A system for determining a leak rate of a device during an adiabatic cooling phase, comprising:
    a leak rate training system receiving leak rate calibration data and generating an adiabatic cooling model from the leak rate calibration data and including a leak rate sampling system setting a leak rate sampling rate for the leak rate calibration data; and
    a leak rate detection system receiving the adiabatic cooling model and leak rate data and determining a leak rate component of the leak rate data using the adiabatic cooling model.

2. A system for determining a leak rate of a device during an adiabatic cooling phase, comprising:
    a leak rate training system receiving leak rate calibration data and generating an adiabatic cooling model from the leak rate calibration data and including a fill detection system generating adiabatic cooling initiation data from the leak rate calibration data; and
    a leak rate detection system receiving the adiabatic cooling model and leak rate data and determining a leak rate component of the leak rate data using the adiabatic cooling model.

3. A system for determining a leak rate of a device during an adiabatic cooling phase, comprising:
    a leak rate training system receiving leak rate calibration data and generating an adiabatic cooling model from the leak rate calibration data and including an adiabatic cooling modeling system solving the following equation for two or more sets of leak rate calibration data at a plurality of time steps: $Y_{K+1}=aY_K+b-cK$, $K=0, 1, 2, \ldots$; where $Y=$a leak rate metric; $a=$a time constant; $b=$a bias pressure term; $c=$a leak rate; and $K=$a time step index variable; and
    a leak rate detection system receiving the adiabatic cooling model and leak rate data and determining a leak rate component of the leak rate data using the adiabatic cooling model.

4. A system for determining a leak rate of a device during an adiabatic cooling phase, comprising:
    a leak rate training system receiving leak rate calibration data and generating an adiabatic cooling model from the leak rate calibration data; and
    a leak rate detection system receiving the adiabatic cooling model and leak rate data and determining a leak rate component of the leak rate data using the adiabatic cooling model and including a leak rate sampling system setting a leak rate sampling rate for the leak rate data.

5. A system for determining a leak rate of a device during an adiabatic cooling phase, comprising:
    a leak rate training system receiving leak rate calibration data and generating an adiabatic cooling model from the leak rate calibration data; and
    a leak rate detection system receiving the adiabatic cooling model and leak rate data and determining a leak rate component of the leak rate data using the adiabatic cooling model and including a fill detection system generating adiabatic cooling initiation data from the leak rate data.

6. A system for determining a leak rate of a device during an adiabatic cooling phase, comprising:
    a leak rate training system receiving leak rate calibration data and generating an adiabatic cooling model from the leak rate calibration data; and
    a leak rate detection system receiving the adiabatic cooling model and leak rate data and determining a leak rate component of the leak rate data using the adiabatic cooling model and including a leak rate interpolation system determining the leak rate component of the leak rate data by interpolating between the leak rate calibration data.

7. A system for determining a leak rate of a device during an adiabatic cooling phase, comprising:
    a leak rate training system receiving leak rate calibration data and generating an adiabatic cooling model from the leak rate calibration data; and
    a leak rate detection system receiving the adiabatic cooling model and leak rate data and determining a leak rate component of the leak rate data using the adiabatic cooling model and including a leak rate convergence system generating leak rate convergence data from the leak rate component of the leak rate data.

8. A system for determining a leak rate of a device during an adiabatic cooling phase, comprising:
    a leak rate training system receiving leak rate calibration data and generating an adiabatic cooling model from the leak rate calibration data; and
    a leak rate detection system receiving the adiabatic cooling model and leak rate data and determining a leak rate component of the leak rate data using the adiabatic cooling model and including a convergence fail leak test system determining when adiabatic cooling has reached a state where changes in the leak rate data caused by adiabatic cooling are less than expected leak rates.

9. A system for determining a leak rate of a device during an adiabatic cooling phase, comprising:
    a pressure measurement system generating calibration leak rate data for the device; and
    a leak rate model system receiving the calibration leak rate data and generating an adiabatic cooling model for the device.

10. A system for determining a leak rate of a device during an adiabatic cooling phase, comprising:
    a mass flow measurement system generating calibration leak rate data for the device; and
    a leak rate model system receiving the calibration leak rate data and generating an adiabatic cooling model for the device.

11. A system for determining a leak rate of a device during an adiabatic cooling phase, comprising:
    a leak rate data system generating calibration leak rate data for the device; and a leak rate model system receiving the calibration leak rate data and generating an adiabatic cooling model for the device and including a leak rate training system receiving the calibration leak rate data and solving a set of finite difference equations to generate the value of one or more variables of the finite difference equations.

12. A system for determining a leak rate of a device during an adiabatic cooling phase, comprising:

a leak rate data system generating calibration leak rate data for the device; and a leak rate model system receiving the calibration leak rate data and generating an adiabatic cooling model for the device and including a leak rate detection system receiving the adiabatic cooling model and leak rate data and determining a leak rate component of the leak rate data using the adiabatic cooling model.

13. A method for determining a leak rate of a device during an adiabatic cooling phase, comprising:

receiving two or more sets of calibration data for the device;

developing an adiabatic cooling model of the device using the two or more sets of calibration data; and using the adiabatic cooling model of the device to determine a leak rate of additional copies of the device during the adiabatic cooling phase by interpolating between the two or more sets of calibration data.

14. A method for determining a leak rate of a device during an adiabatic cooling phase, comprising:

receiving a first set of leak rate data for a device having no appreciable leakage and receiving a second set of leak rate data for a device having a calibrated leak rate;

developing an adiabatic cooling model of the device using the two sets of leak rate data; and using the adiabatic cooling model of the device to determine a leak rate of additional copies of the device during the adiabatic cooling phase by extracting an adiabatic cooling component of leak rate data.

15. A method for determining a leak rate of a device during an adiabatic cooling phase, comprising:

receiving two or more sets of calibration data for the device;

developing an adiabatic cooling model of the device using the two or more sets of calibration data;

using the adiabatic cooling model of the device to determine a leak rate of additional copies of the device during the adiabatic cooling phase by extracting an adiabatic cooling component of leak rate data;

determining whether the leak rate of an additional copy of the device is converging; and terminating the leak rate determination if the leak rate has converged.

16. A method for determining a leak rate of a device during an adiabatic cooling phase, comprising:

receiving two or more sets of calibration data for the device;

developing an adiabatic cooling model of the device using the two or more sets of calibration data;

using the adiabatic cooling model of the device to determine a leak rate of additional copies of the device during the adiabatic cooling phase by extracting an adiabatic cooling component of leak rate data;

determining whether the leak rate of an additional copy of the device is converging; and continuing the leak rate determination until the adiabatic cooling phase has ended if the leak rate has not converged.

17. A method for determining a leak rate of a device during an adiabatic cooling phase, comprising:

receiving two or more sets of pressure data;

developing an adiabatic cooling model of the device using the two or more sets of pressure data;

using the adiabatic cooling model of the device to determine a leak rate of additional copies of the device during the adiabatic cooling phase by extracting an adiabatic cooling component of leak rate data.

* * * * *